(12) United States Patent
Yoon

(10) Patent No.: US 7,630,042 B2
(45) Date of Patent: Dec. 8, 2009

(54) LIQUID CRYSTAL DISPLAY DEVICE AND METHOD FOR MANUFACTURING THE SAME

(75) Inventor: Sung Hoe Yoon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 319 days.

(21) Appl. No.: 11/474,367

(22) Filed: Jun. 26, 2006

(65) Prior Publication Data
US 2007/0002237 A1    Jan. 4, 2007

(30) Foreign Application Priority Data
Jun. 30, 2005    (KR) .................... 10-2005-0058301

(51) Int. Cl.
*G02F 1/1337* (2006.01)
*G02F 1/1339* (2006.01)

(52) U.S. Cl. .................. 349/129; 349/155; 349/157
(58) Field of Classification Search ............... 349/128, 349/129, 155–157
See application file for complete search history.

(56) References Cited

U.S. PATENT DOCUMENTS

| | | | |
|---|---|---|---|
| 5,894,194 A * | 4/1999 | Lu et al. ................. | 313/496 |
| 6,359,667 B1 | 3/2002 | Koyanagi et al. | |
| 6,429,917 B1 | 8/2002 | Okamoto et al. | |
| 6,501,527 B1 | 12/2002 | Hirose et al. | |
| 6,833,899 B2 * | 12/2004 | Sunohara et al. .......... | 349/142 |
| 6,906,772 B2 * | 6/2005 | Kim ...................... | 349/153 |
| 7,247,411 B2 * | 7/2007 | Song ..................... | 430/7 |
| 7,277,151 B2 * | 10/2007 | Ryu et al. ............... | 349/155 |
| 2002/0167635 A1 * | 11/2002 | Yi ....................... | 349/155 |
| 2005/0190338 A1 * | 9/2005 | Lim ..................... | 349/156 |
| 2006/0152668 A1 * | 7/2006 | Jang et al. .............. | 349/156 |
| 2007/0070281 A1 * | 3/2007 | Choi .................... | 349/141 |
| 2007/0188697 A1 * | 8/2007 | Oh et al. ................ | 349/156 |

FOREIGN PATENT DOCUMENTS

| | | |
|---|---|---|
| JP | 10-39318 | 2/1998 |
| JP | 2001-83526 | 3/2001 |
| JP | 2004-301933 | 10/2004 |

* cited by examiner

*Primary Examiner*—Uyen Chau N Le
*Assistant Examiner*—Rhonda S Peace
(74) *Attorney, Agent, or Firm*—McKenna Long & Aldridge LLP

(57) ABSTRACT

An LCD device and a method for manufacturing the same are disclosed, in which a protrusion is arranged to substantially oppose a column spacer to reduce a contact area between the column spacer and its opposing substrate, and the protrusion is formed of an organic material to minimize deformation of the column spacer. The LCD device further comprises first and second substrates opposing each other, gate and data lines crossing each other on the first substrate to define pixel regions, thin film transistors formed at crossings of the gate lines and the data lines, a first column spacer formed of a first organic material on a predetermined portion of the second substrate, a protrusion formed of a second organic material on the first substrate of a position substantially corresponding to the first column spacer, and a liquid crystal layer filled between the first and second substrates.

11 Claims, 9 Drawing Sheets

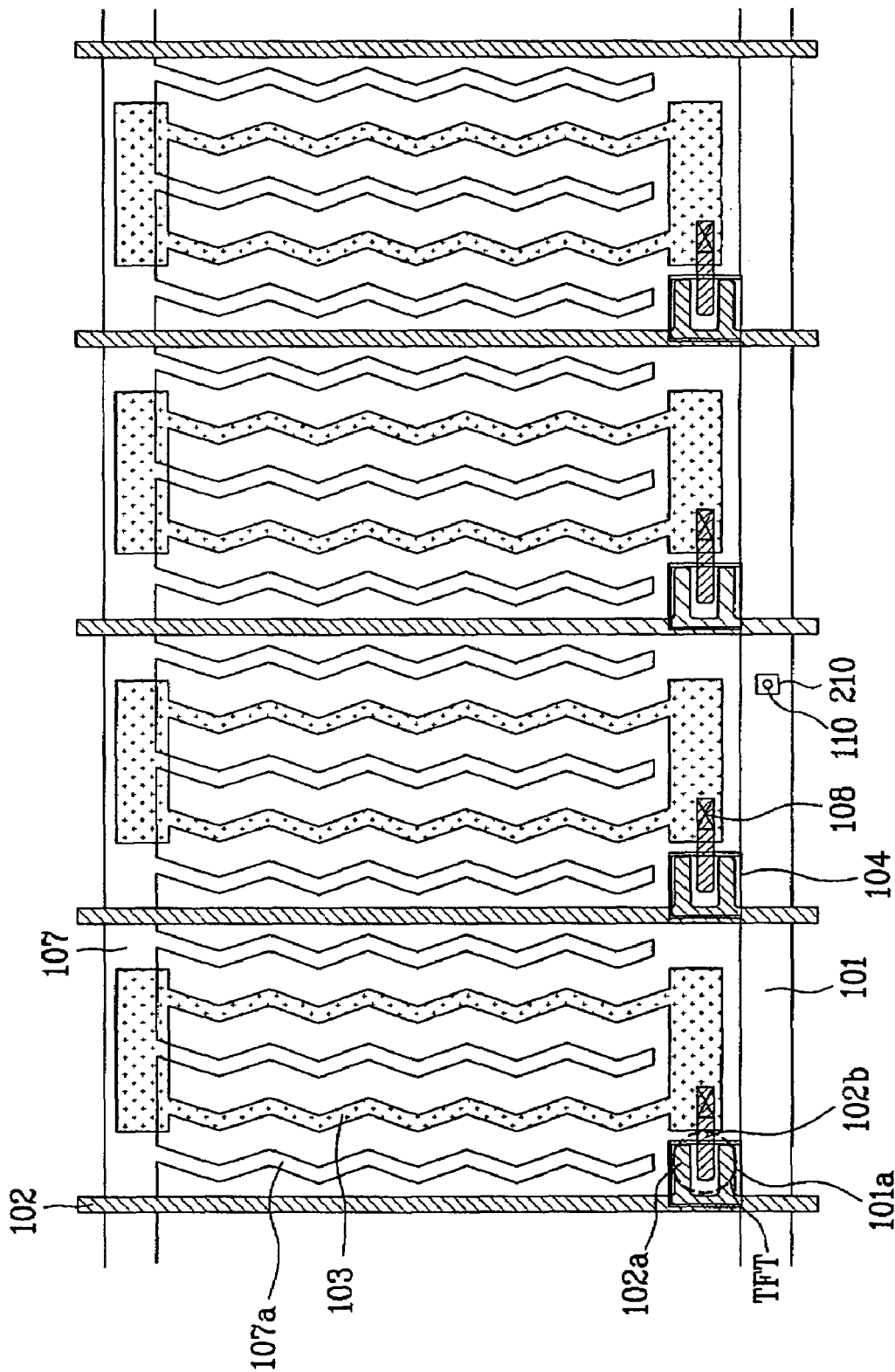

LIQUID CRYSTAL DISPLAY DEVICE AND METHOD FOR MANUFACTURING THE SAME

This application claims the benefit of the Korean Patent Application No. 10-2005-0058301, filed on Jun. 30, 2005, which is hereby incorporated by reference for all purposes as if fully set forth herein.

BACKGROUND OF THE INVENTION

1. Field of the Invention

The present invention relates to a liquid crystal display (LCD) device, and more particularly, to an LCD device and a method for manufacturing the same, in which a protrusion substantially opposes a column spacer to reduce contact area between the column spacer and its opposing substrate, and the protrusion may be formed of an organic material to minimize deformation of the column spacer.

2. Discussion of the Related Art

Demands for various display devices have increased along with the development of the information age. Accordingly, many efforts have been made to research and develop various flat display devices such as liquid crystal display (LCD), plasma display panel (PDP), electroluminescent display (ELD), and vacuum fluorescent display (VFD). Some types of flat display devices have already been implemented in various types of equipment.

Among the various flat display devices, liquid crystal display (LCD) devices have been most widely used due to advantages such as thin profile, lightness in weight, and low power consumption. Thus, LCD devices provide a preferred substitute over Cathode Ray Tube (CRT). In addition to mobile type LCD devices such as notebook computers, LCD devices have been developed for computer monitors and televisions to receive and display broadcasting signals.

In order to implement LCD devices in various fields as a preferred display, the key to developing LCD devices depends on whether they can produce a high quality picture, such as high resolution and high luminance with a large-sized screen, while still maintaining lightness in weight, a thin profile, and low power consumption.

Meanwhile, a spacer may be formed between first and second substrates of the aforementioned LCD device to maintain a constant gap for a liquid crystal layer.

The spacer may be a ball spacer or a column spacer, for example, depending on shape and other variables.

The ball spacer has a spherical shape, and may be dispersed on the first and second substrates. Also, the ball spacer moves rather freely even after the first and second substrates are bonded to each other. The ball spacer has a small contact area with the first and second substrates.

By contrast, the column spacer may be formed by an array process on the first substrate or the second substrate. The column spacer may be formed on a predetermined substrate in a column shape having a predetermined height. Therefore, the column spacer has a relatively great contact area with the first and second substrates.

Hereinafter, a related art LCD device provided with a column spacer will be described with reference to the accompanying drawings.

FIG. 1 is a sectional view illustrating a related art LCD device provided with a column spacer.

As shown in FIG. 1, the related art LCD device provided with a column spacer includes first and second substrates 30 and 40 opposing each other, a column spacer 20 formed between the first and second substrates 30 and 40, and a liquid crystal layer (not shown) filled between the first and second substrates 30 and 40.

The first substrate 30 includes a gate line 31 crossing a data line (not shown) to define a pixel region, a thin film transistor TFT formed at a crossing region of the gate line 31 and the data line, and a pixel electrode (not shown) formed in each pixel region.

The second substrate 40 includes a black matrix layer 41 corresponding to a region other than the pixel region, a stripe shaped color filter layer 42 corresponding to vertical pixel regions parallel with the data line, and a common electrode or an overcoat layer 43 formed on the color filter layer 42.

The column spacer 20 corresponds to a predetermined position above the gate line 31.

The first substrate 30 further includes a gate insulating layer 36 formed on the entire surface including the gate line 31, and a passivation layer 37 formed on the gate insulating layer 36.

FIGS. 2A and 2B are a plane view and a sectional view illustrating a touch defect of the related art LCD device provided with a column spacer.

As shown in FIGS. 2A and 2B, in the related art LCD device provided with the column spacer, if an LCD panel 10 is touched with a finger or instrument along a predetermined direction, a spot is generated on the touched portion. The spot is referred to as a touch spot or a touch defect because the spot is generated on the screen of the LCD panel.

It is noted that such a touch defect is caused by the frictional force generated by a large contact area between the column spacer 20 and its opposing first substrate 1. In other words, as shown in FIG. 2B, the column spacer 20 is in contact with the first substrate 1 to form a relatively large contact area unlike the ball spacer. Therefore, it takes a long time to restore the first and second substrates 1 and 2 which have been shifted, due to touching, from their original state. For this reason, the spot remains until the first and second substrates 1 and 2 are restored to their original state.

The aforementioned related art LCD device provided with the column spacer has the following problems.

First, when the LCD panel is touched with a finger or instrument, the black state of the panel becomes unbalanced. In other words, the substrate may be deformed by a load that deforms the substrate in a direction of a polarizing plate attached onto a surface (rear surface) of the LCD panel when the polarizing plate is contracted or relaxed due to surrounding humidity and temperature change. For this reason, alignment of the liquid crystals may be disturbed, and as a result, an unbalanced black state is caused. Also, the upper and lower substrates may be distorted in the range of about 20 μm to 100 μm by touch (rubbing) of the LCD panel. In this case, even after a finger is removed from the LCD panel after touching, the two substrates fail to restore to their original state due to surface tension between them, thereby continuing to generate light leakage. As a result, the black screen becomes unbalanced.

This is because the pulling load generated as the column spacer is closely attached onto its opposing substrate is greater than a restoring load needed to return the substrate to its original shape.

SUMMARY OF THE INVENTION

Accordingly, the present invention is directed to liquid crystal display device and a method for manufacturing the same, which substantially obviates one or more of the problems due to limitations and disadvantages of the related art.

An advantage of the present invention is to provide an LCD device and a method for manufacturing the same, in which a protrusion substantially opposes a column spacer to reduce contact area between the column spacer and its opposing substrate, and the protrusion may be formed of an organic material to minimize deformation of the column spacer.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an LCD device comprises: first and second substrates opposing each other, gate and data lines crossing each other on the first substrate to define pixel regions, thin film transistors formed at crossing portions of the gate lines and the data lines, a first column spacer formed of a first organic material on a predetermined portion of the second substrate, a protrusion formed of a second organic material on the first substrate corresponding to the first column spacer the protrusion having an upper surface of a critical dimension relatively smaller than that of the column spacer, and a liquid crystal layer filled between the first and second substrates.

The first organic material and the second organic material may have an elastic recovery rate of 60% or greater.

The first organic material may be the same as the second organic material.

The protrusion may include a ball spacer formed on a fixed position of the first substrate.

The ball spacer may include at least one of polystyrene, divinyl benzene, poly-vinyl alcohol, and poly-acrylate or other suitable material.

The ball spacer may have a diameter of 20 μm or less.

The protrusion may be formed of a second column spacer having an upper surface relatively smaller than that of the first column spacer.

The second column spacer may include a photo-initiator, a thermal-initiator, a responsive monomer, and an adhesion promoter.

The upper surface (contact area with the column spacer) of the protrusion may have a critical dimension of 10 μm or less.

The lower surface of the first column spacer corresponding to the second substrate may have a critical dimension of about 20 μm to 50 μm.

The first column spacer may include a photo-initiator, a thermal-initiator, a responsive monomer, and an adhesion promoter.

In another aspect of the present invention, a method for manufacturing an LCD device comprises: preparing first and second substrates opposing each other, forming a thin film transistor array on the first substrate and a color filter array on the second substrate, forming a column spacer of a first organic material on a predetermined portion of the second substrate, forming a protrusion formed of a second organic material on the first substrate to correspond to the column spacer the protrusion having an upper surface of a critical dimension relatively smaller than that of the column spacer, dropping liquid crystals onto any one of the first substrate and the second substrate, and bonding the first and second substrates to each other so that the protrusion on the first substrate substantially opposes the column spacer on the second substrate.

The protrusion may be formed by preparing a solution in which a resin including a ball spacer is dispersed and dotting the solution using an inkjet device.

The protrusion may be formed by preparing a negative photoresist film including a ball spacer and dotting the negative photoresist film using an inkjet device.

The protrusion may be formed by coating the second organic material on the first substrate and selectively exposing and developing the coated organic material.

The column spacer may be formed by coating the first organic material on the second substrate and selectively exposing and developing the coated organic material.

The first organic material and the second organic material may have elastic recovery rates of 60% or greater.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 9 is a plane view illustrating an LCD device according to the present invention.

DETAILED DESCRIPTION OF THE ILLUSTRATED EMBODIMENTS

Reference will now be made in detail to an embodiment of the present invention, example of which is illustrated in the accompanying drawings. Wherever possible, the same reference numbers will be used throughout the drawings to refer to the same or like parts.

When an LCD panel is touched with a finger or instrument, a touch defect is caused by friction generated due to a large contact area between a column spacer and its opposing substrate. For this reason, it takes a long time for the substrate to restore to its original position. Therefore, efforts to remove the touch defect have been suggested. One such effort is an LCD device having a protrusion in which the protrusion is formed to substantially oppose a column spacer so that a column spacer is in contact with its opposing substrate at a contact area smaller than an upper surface of the column spacer.

While the column spacer has been described as columnar, it is to be understood that the column spacer may include other shapes and configurations and thus it is intended that the column spacer be a column spacer and other equivalent structures. That is, the column spacer is not limited in shape and configuration to that represented in the Figures and the description. Similarly, the protrusion may be comprised of various shapes and configurations and is not limited to the representations of the Figures or description.

Figure 1:
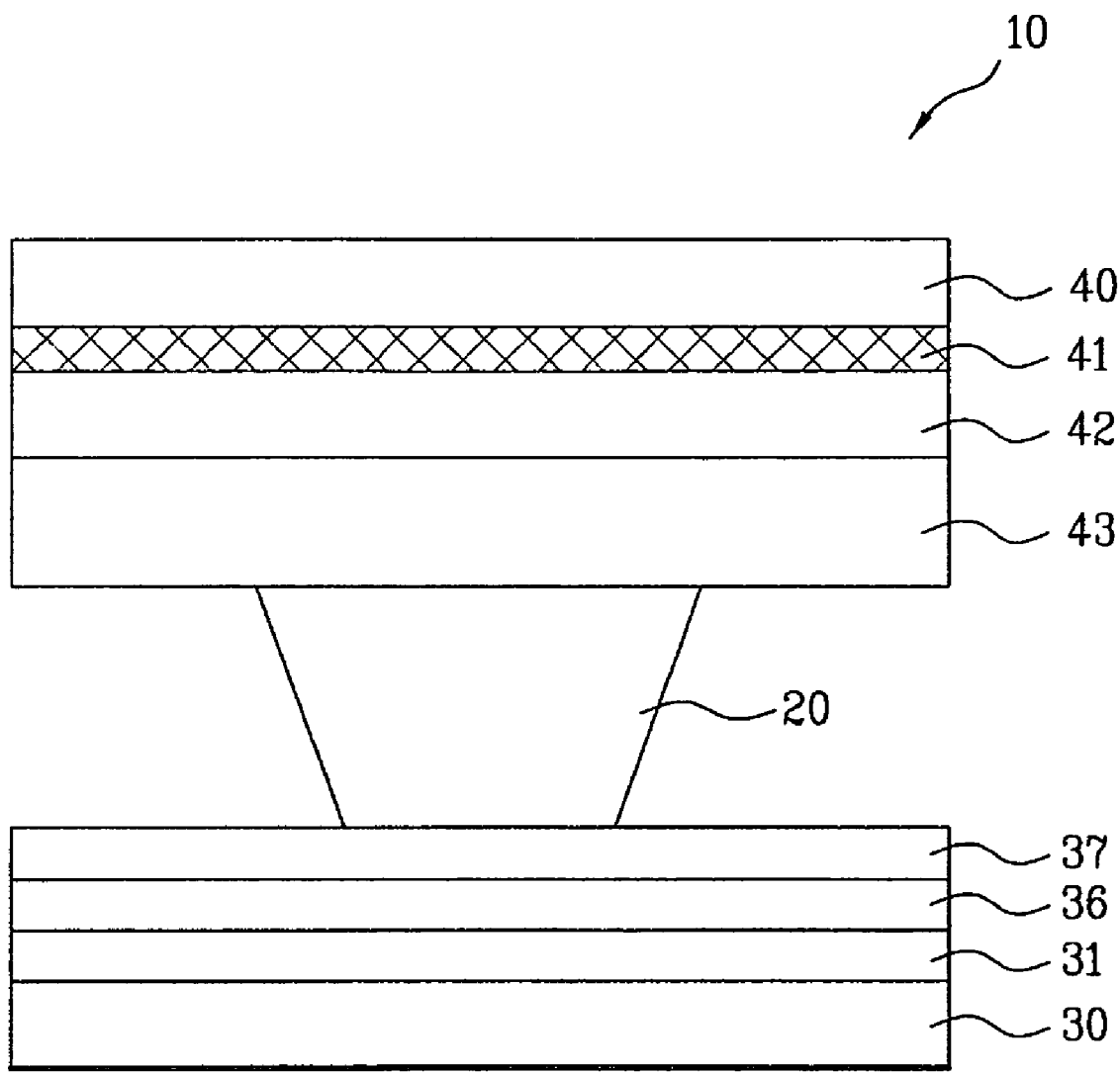
FIG. 1 is a sectional view illustrating a related art LCD device provided with a column spacer.
Figure 2A:
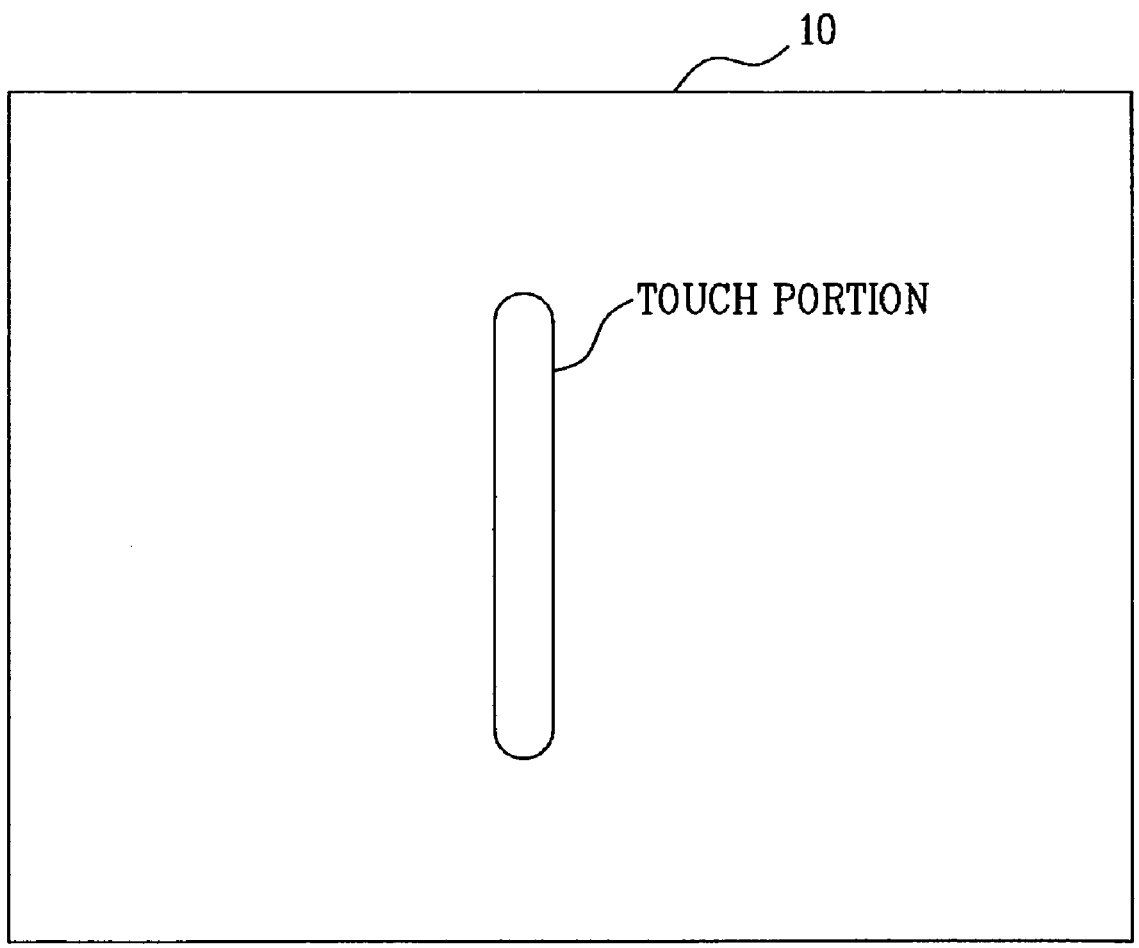
FIGS. 2A and 2B are a plane view and a sectional view illustrating a touch defect of the related art LCD device provided with a column spacer.
Figure 2B:
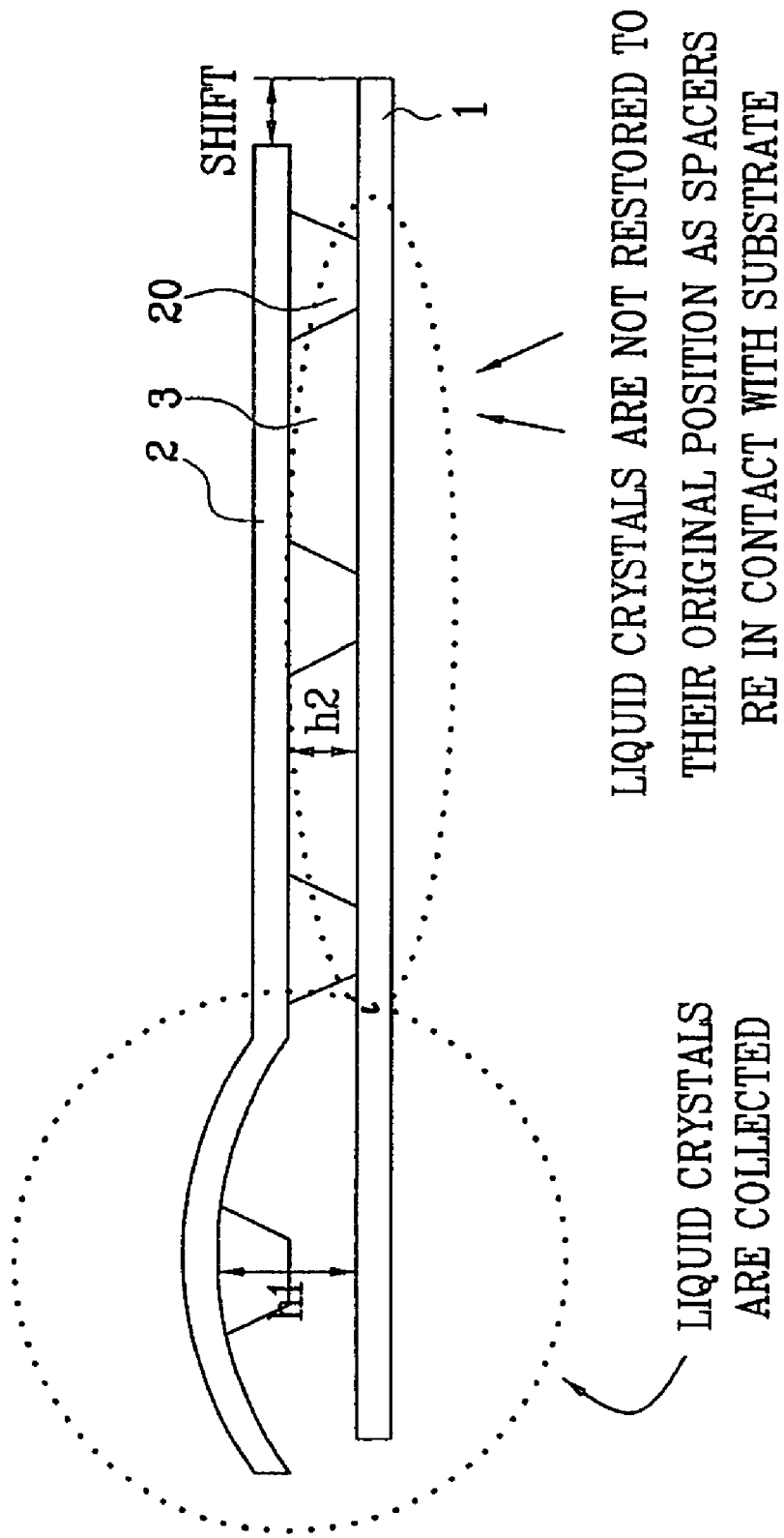
Figure 3:
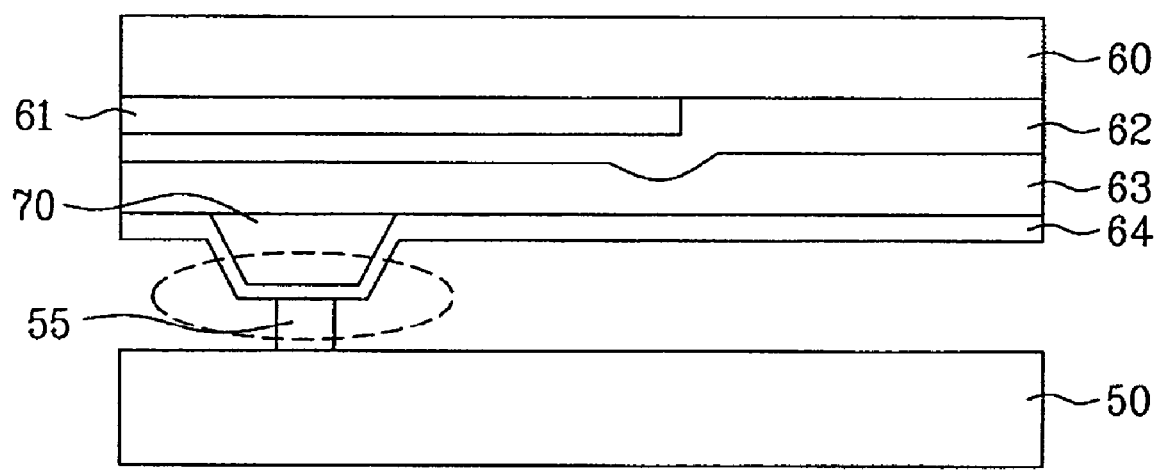
FIG. 3 is a sectional view illustrating an LCD device provided with an protrusion structure of an inorganic material.

FIG. 3 is a sectional view illustrating an LCD device having a protrusion of an inorganic material according to a first embodiment of the present invention.

As shown in FIG. 3, the LCD device having a protrusion of an inorganic material according to the present invention comprises first and second substrates 50 and 60 opposing each other, a column spacer 70 formed at a predetermined portion on the second substrate 60, a protrusion 55 having a volume relatively smaller than that of the column spacer 70, formed on the first substrate 50 to contact a predetermined portion of the column spacer 70, and a liquid crystal layer (not shown) filled between the first and second substrates 50 and 60.

The first substrate 50 is a thin film transistor array substrate provided with a thin film transistor array, and the second substrate 60 is a color filter array substrate provided with a color filter array.

The thin film transistor array formed on the first substrate 50 is omitted in the drawing and only the protrusion 55 is shown.

For example, the thin film transistor array may include a gate line, a data line crossing the gate line to define a pixel region, a pixel electrode formed in the pixel region, and a thin-film transistor formed at a crossing region of the gate and data lines.

A black matrix layer 61, a color filter layer 62, and an overcoat layer 63 are formed on the second substrate 60. The column spacer 70 is formed on the overcoat layer 63 of the second substrate 60 corresponding to the protrusion 55. An alignment layer 64 is formed on the entire surface of the overcoat layer 63 including the column spacer 70.

The column spacer 70 may be formed by patterning an organic material using an exposure process.

For the protrusion 55 of an organic material, when the first substrate 50 or the second substrate 60 is shifted with respect to its opposing substrate as the surface of the first substrate 50 or the second substrate 60 is touched (rubbed or grazed in one direction), a contact area between the column spacer 70 and the protrusion 55 is reduced by an upper area of the protrusion 55 being relatively smaller than an upper surface (where the column spacer 70 opposes the protrusion 55, in this case, the portion where the column spacer 70 is formed on the surface of the second substrate 60 is referred to as a lower surface) of the column spacer 70. A frictional force between the column spacer 70 and its opposing substrate, the first substrate 50, is reduced due to a reduced frictional area. Therefore, when the first substrate 50 or the second substrate 60 is pushed in one direction by touch, either the first substrate 50 or the second substrate 60 is easily restored to its original state.

In the present embodiment the protrusion 55 has elasticity relatively smaller than that of the column spacer 70. It may be possible that the column spacer 70 may be deformed during a bonding process or when it is pressurized by an external load.

Figure 4A:
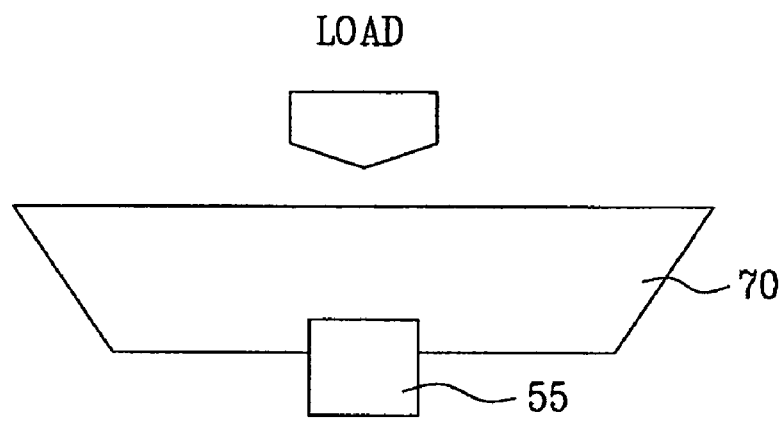
FIGS. 4A and 4B are sectional views illustrating before and after states of a column spacer corresponding to a protrusion structure of an inorganic material when subjected to a load.
Figure 4B:
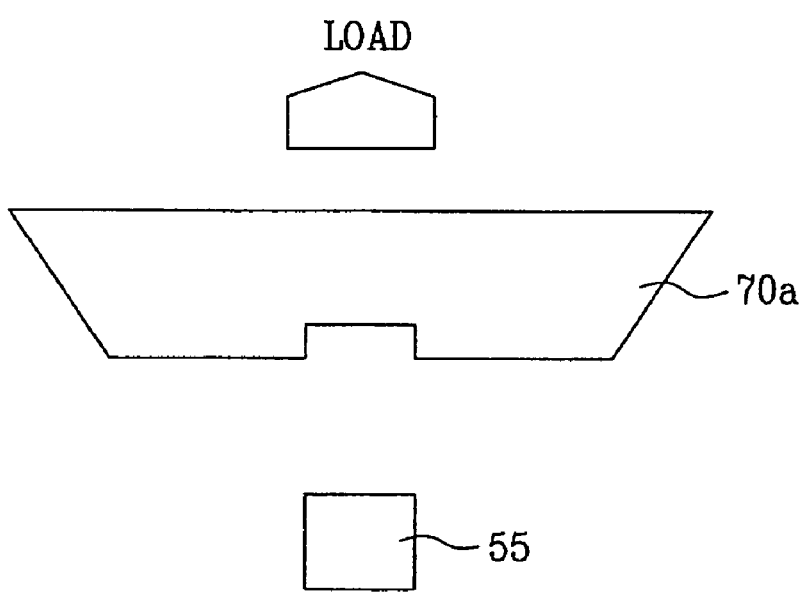

FIGS. 4A and 4B are sectional views illustrating before and after states of the column spacer corresponding to the protrusion of an inorganic material when subjected to a load that causes deformation of the column spacer.

As shown in FIG. 4A, after the column spacer 70 of an organic material is formed to substantially correspond to the protrusion 55 of an inorganic material, if the column spacer 70 is in contact with the protrusion 55 by bonding or pressure, the column spacer 70 corresponding to the protrusion 55 may be pushed (imprinted).

As shown in FIG. 4B, even though the load applied to the upper portion of the column spacer 70 is removed, the shape of the column spacer 70 corresponding to the protrusion 55 remains deformed. The portion where the column spacer 70 is seriously pushed (imprinted) may be observed by the naked eye. This is known as a display defect.

As described with reference to FIGS. 3 to 4B, the LCD device having a protrusion has been developed to improve an unbalanced black state observed in the LCD device provided with a column spacer. In other words, a protrusion structure is inserted into the first substrate (thin film transistor array substrate) to quickly restore the first substrate to its original state even though stress is applied to the LCD panel, so that the contact area between the first substrate and the column spacer of the second substrate (color filter array substrate) can be reduced. As a result, an unbalanced black state can remarkably be improved.

In the aforementioned protrusion structure, since the protrusion 55 is formed of an inorganic material, the external load is first contacted with the protrusion 55 on the first and second substrates 50 and 60 and thus concentrated thereon. If the external load is transferred to the column spacer 70 contacted with the protrusion 55 exceeds a load limit, the organic material of the column spacer 70 may not return to its original state. For this reason, permanent deformation of the column spacer 70 may be caused, which locally deteriorates cell gap, thereby resulting in a side effect known as a spot found in a corresponding portion.

In other words, the column spacer 70 is designed to be pushed by the protrusion 55 and then restored to its original state (elastic force) if a load pushed by the protrusion 55 is removed in view of a predetermined load limit. However, even though the load locally concentrated on the protrusion 55 is removed after it is applied to the column spacer 70 beyond its limit range, the column spacer 70 may remain deformed without being restored to its original state if the predetermined load limit is exceeded.

Hereinafter, the LCD device and a method for manufacturing the same will be described with reference to the accompanying drawings, in which an unbalanced black state is improved by the protrusion structure and at the same time the column spacer and its relevant layers are prevented from being deformed.

Figure 5:
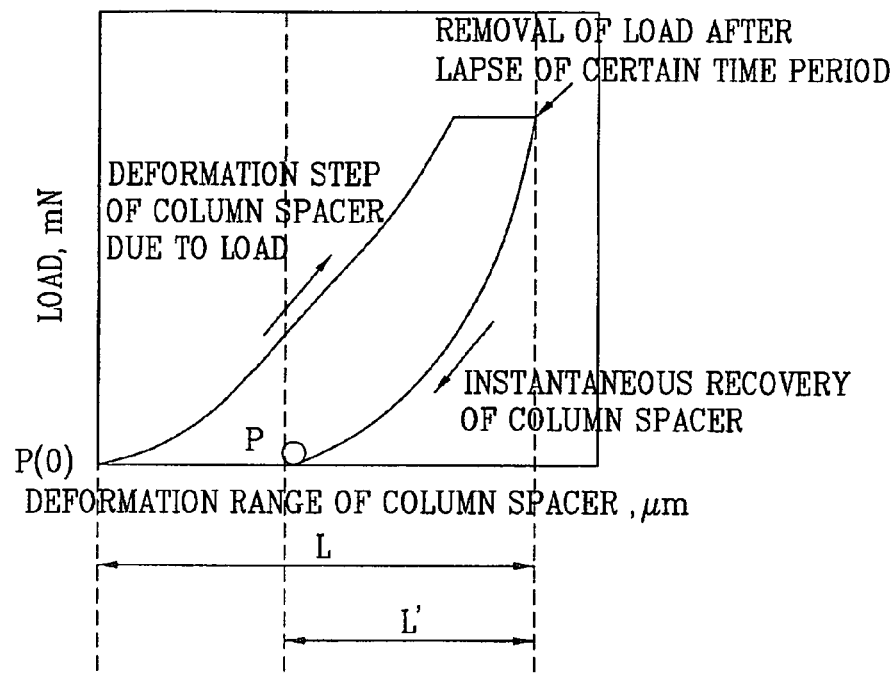
FIG. 5 is a graph illustrating a deformation range of a column spacer as a function of load.

FIG. 5 is a graph illustrating a deformation range of the column spacer as a function of load.

As shown in FIG. 5, when a predetermined load is applied to the column spacer in a vertical direction, the elastic column spacer is compressed and its height is deformed. If the load is removed, the column spacer is restored to its original state or a similar state depending on its elastic recovery rate. In this case, if the column spacer is substantially restored to its original state, the elastic recovery rate is good. By contrast, if the column spacer is poorly restored to its original state, the elastic recovery rate is low.

As shown in FIG. 5, if a deformation range of the column spacer is tested with increase of pressure against the column spacer, it is noted that the column spacer is almost linearly deformed in proportion to pressure until the deformation range reaches a certain level. Even though the same load is applied to the column spacer under a certain pressure, the column spacer is deformed in a direction of the load. In this case, the deformation range of the column spacer to reach a predetermined time period under a given pressure is L.

After the load is completely removed under the given pressure, the column spacer is instantaneously restored to its original state. In other words, even though the load is completely removed, the column spacer is not completely restored to its original state but restored to the state corresponding to L'. In this case, the elastic recovery rate of the column spacer is defined in the range of [L'/L]*100%.

The initial displacement of the column spacer is referred to as P(0), and the recovery displacement when the deformed column spacer is instantaneously restored to its original state under pressure is referred to as P.

Figure 6:
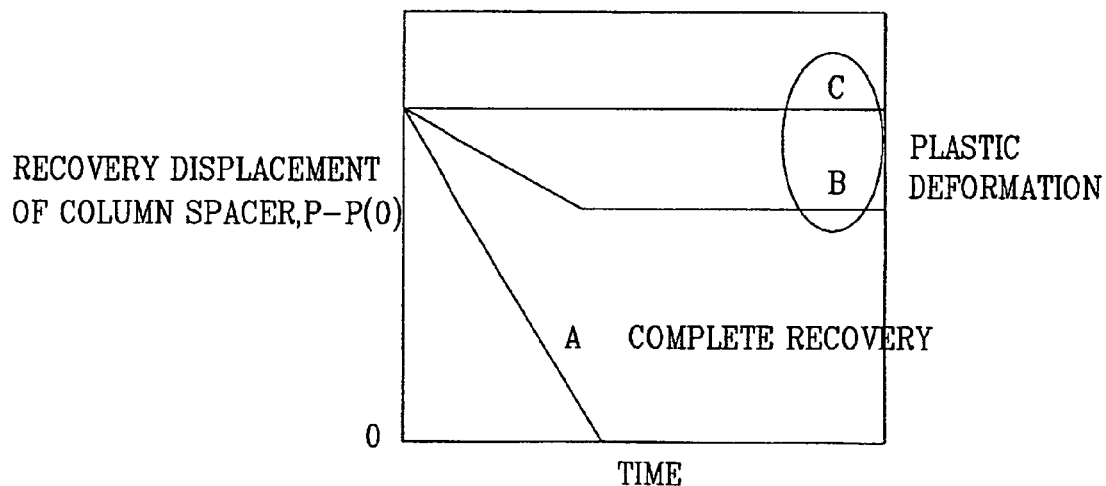
FIG. 6 is a graph illustrating recovery displacement of a column spacer per material depending on a time period.

FIG. 6 is a graph illustrating recovery displacement of the column spacer per material as a function of time.

Referring to FIG. 6, the recovery displacement of each column spacer formed of each material of A, B and C is shown as a function of time when the applied pressure is removed. The recovery displacement of each column spacer is obtained by subtracting the initial displacement P(0) of the column spacer from the recovery displacement P when the column spacer is recovered after deformation. In this case, the recovery displacement of the column spacer formed of A is 0, and this value means that the column spacer is restored to its original state without deformation when the pressure applied to the column spacer is removed. The recovery displacement P of the column spacer formed of C means that the column spacer remains deformed without being restored to its original state after the column spacer is deformed by pressure. The column spacer formed of material B has intermediate characteristics between materials A and C. In this respect, the materials B and C generate plastic deformation, and are especially likely to generate deformation in the aforementioned protrusion structure of an inorganic material.

Hereinafter, in order to prevent deformation of the column spacer when the substrates are pressurized or bonded to each other, the LCD device having a protrusion of an organic material according to the present invention will be described.

Figure 7:
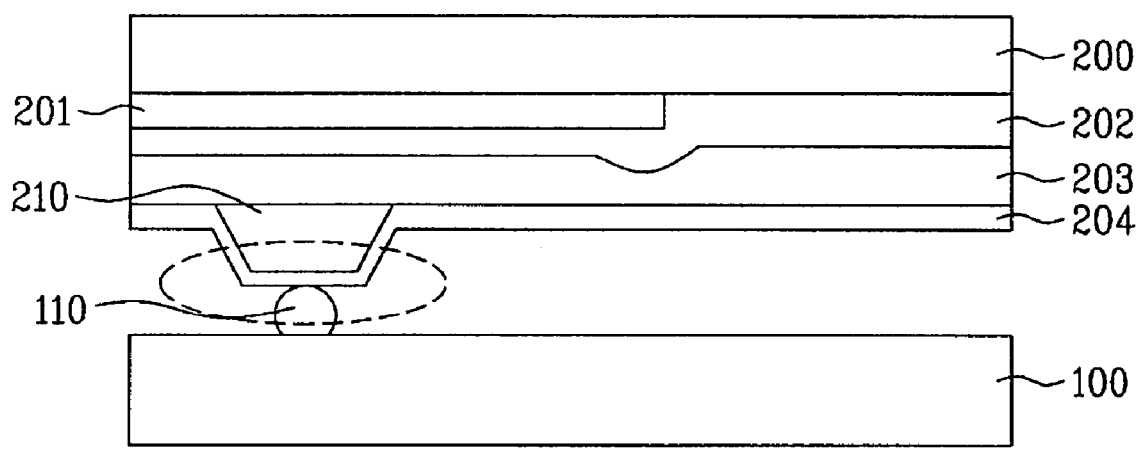
FIG. 7 is a sectional view illustrating an LCD device having a protrusion structure of an organic material according to the present invention.

FIG. 7 is a sectional view illustrating an LCD device having a protrusion of an organic material according to the present invention.

As shown in FIG. 7, the LCD device having a protrusion of an organic material according to the present invention includes first and second substrates 100 and 200 opposing each other, a column spacer 210 formed at a predetermined portion on the second substrate 200, a protrusion 110 having a volume relatively smaller than that of the column spacer 210, formed on the first substrate 100 to contact a predetermined portion of the column spacer 210, and a liquid crystal layer (not shown) filled between the first and second substrates 100 and 200.

The first substrate 100 is a thin film transistor array substrate provided with a thin film transistor array, and the second substrate 200 is a color filter array substrate provided with a color filter array.

The thin film transistor array formed on the first substrate 100 is omitted in the drawing and only the protrusion 110 is shown. For example, the thin film transistor array may include a gate line, a data line crossing the gate line to define a pixel region, a pixel electrode in the pixel region, and a thin film transistor formed at a crossing region of the gate and data lines.

The protrusion 110 may be formed by patterning an organic material when the thin film transistor array is formed on the first substrate 100. In this case, the thin film transistor array may be formed by the process steps of forming a gate line including a gate electrode, a gate insulating layer, a semiconductor layer, a data line including source/drain electrodes, a passivation layer, and a pixel electrode. Alternatively, the protrusion 110 may be formed by additionally forming an organic layer between the process step of forming a gate line and the process step of forming a pixel electrode and patterning the organic layer. In either case, the protrusion 110 is formed at a predetermined portion on the gate and data lines.

A black matrix layer 201, a color filter layer 202, and an overcoat layer 203 are formed on the second substrate 200. The column spacer 210 is formed on the overcoat layer 203 of the second substrate 200 substantially corresponding to the protrusion 110. An alignment layer 204 is formed on the entire surface of the overcoat layer 203 including the column spacer 210.

The column spacer 210 may be formed by patterning an organic material using an exposure process.

Main components of the column spacer 210 may comprise a photo-initiator, a thermal-initiator, a responsive monomer (photo-responsive monomer, thermal-responsive monomer, monomer having photo-responsive characteristics and thermal-responsive characteristics, oligomer, or polygomer or other suitable material), and an adhesion promoter. When the column spacer is formed using an inkjet device, a non-responsive volatile solvent may be added to the components of the column spacer to control viscosity in a head of the inkjet device.

The protrusion 110 may be formed by dotting at a predetermined position (corresponding to the column spacer) using the inkjet device. In this case, the protrusion 110 is formed in such a manner that a resin solution is cured using an exposure process or a thermal treatment process and then fixed to the first substrate 100 after a ball spacer is dispersed in the resin solution and dotted at a predetermined position using the inkjet device. Alternatively, the protrusion 110 may be formed in such a manner that an organic insulating material having the same or similar physical properties as those of the column spacer 210 is patterned in a column spacer shape having an upper surface smaller than that of the column spacer 210.

If the protrusion 110 is a ball type spacer, the protrusion 110 is formed after the alignment layer is formed. In more detail, after the solution in which the ball spacer is dispersed in a resin solution is prepared and coated on a corresponding position of the column spacer in a dotting manner using an inkjet nozzle, the resin solution is cured using an exposure process or a thermal treatment process and fixed to the substrate. At this time, the size of the ball spacer is controlled to have a diameter of about 20 μm or less, more preferably about 10 μm or less. The ball spacer shaped protrusion 110 may be formed to have a small size so that the column spacer 210 and the upper surface (contact area with the protrusion) all overlap the whole portion of the protrusion 110.

When the protrusion 210 is formed as a ball spacer, the ball spacer may be made of at least one of polystyrene, divinyl benzene, poly-vinyl alcohol, poly-acrylate, or other suitable materials. In more detail, when the protrusion is formed as a ball spacer, a core of the ball spacer may be made of at least one of polystyrene and divinyl benzene. A response group (OH—) of the core may include poly-vinyl alcohol, poly-acrylate or a structure resulting from poly-vinyl alcohol or poly-acrylate. In this case, the response group of the ball spacer core is fixed onto the first substrate by surface treatment (thermal treatment).

If the protrusion 110 is formed as a column spacer, the alignment layer is formed after the protrusion 110 is formed. In this case, the protrusion 110 may be formed of a photo-initiator, a thermal-initiator, a responsive monomer, an adhesion promoter, or other suitable materials. In the LCD device of the present invention, the column spacer and the protrusion corresponding to the column spacer may be formed of a material obtained by adding acryl or acryl epoxy resin to a responsive monomer or other appropriate material.

The process of forming the column spacer may comprise the steps of coating an organic insulating material, exposing a predetermined portion of the organic insulating material, removing the exposed portion or the non-exposed portion using a developer, and performing a baking process. In this case, the column spacer is formed using an organic insulating layer having a good elastic recovery rate (about 60% or greater). Also, the lower surface (corresponding to the second substrate) of the column spacer has a critical dimension (CD) greater than that of the upper surface (corresponding to the first substrate) of the column spacer. The critical dimension of the lower surface may be in the range of about 20 μm to 50 μm, more preferably about 30 μm to 40 μm.

The protrusion 110 and the column spacer 210 may be formed of a material obtained by adding acryl or acryl-epoxy resin to a responsive monomer or other suitable material so that they have similar physical properties. Particularly, materials having similar elastic recovery rates may be used as the protrusion 110 and the column spacer 210.

Figure 8A:
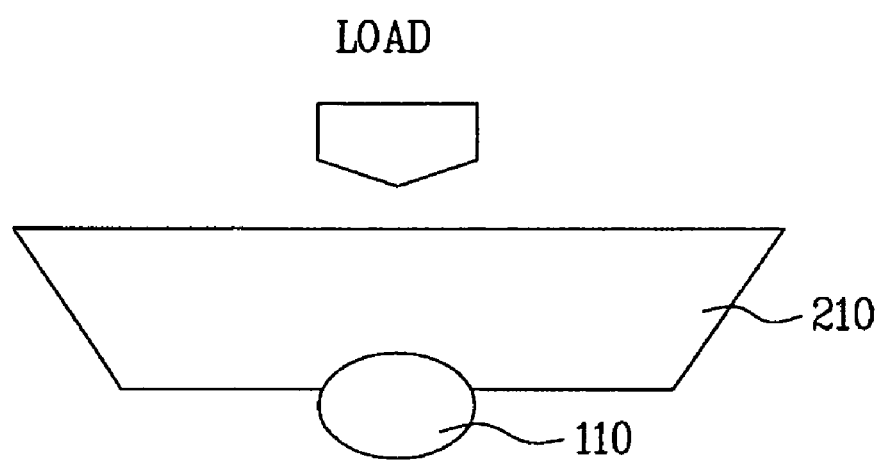
FIGS. 8A and 8B are sectional views illustrating before and after states of a column spacer corresponding to a protrusion structure of an inorganic material when subjected to a load.
Figure 8B:
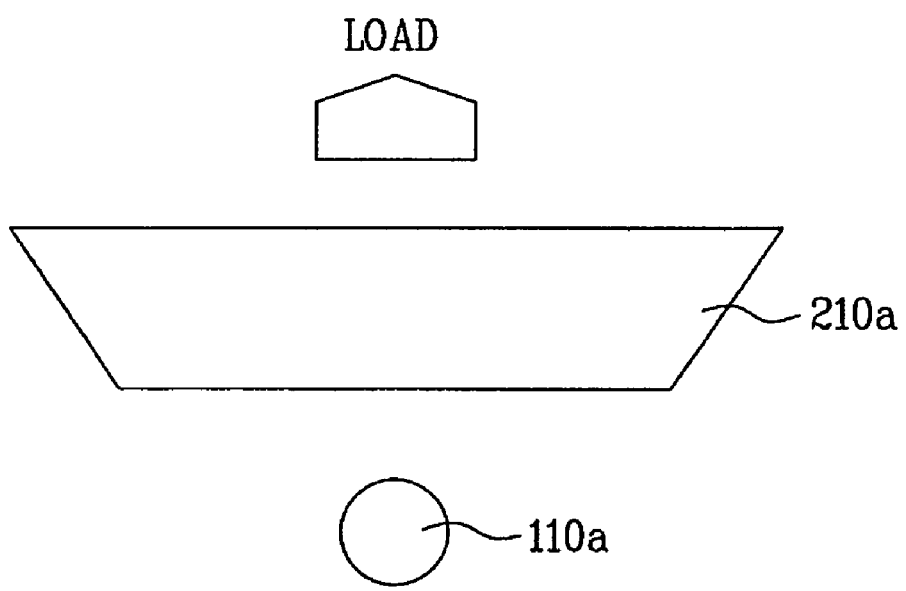

FIGS. 8A and 8B are sectional views illustrating a before and after state of the column spacer corresponding to the protrusion structure of an inorganic material when subjected to a load.

As shown in FIG. 8A, the external load is concentrated on a portion where the column spacer 210 is first contacted with the protrusion 110, in the same manner as the general protrusion structure. However, since the protrusion 110 is formed of an organic material having physical properties similar to those of the column spacer, unlike a protrusion of a metal or semiconductor material, the load applied to the first substrate 100 or the second substrate 200 is uniformly dispersed upon the protrusion and the column spacer 210.

Therefore, the load applied to the column spacer 210 is reduced to about half. This reduces the probability of the threshold load that causes plastic deformation of the column spacer 210. As shown in FIG. 8B, if the external load is removed, the external load is dispersed through column spacer 210a and protrusion 110a alike. In this case, a load less than the external load that causes plastic deformation, is applied to the column spacer 210a. As a result, the column spacer 210a is completely restored to its original state (dimensions) even though it may take time through the pressurizing and bonding processes.

As described above, the LCD device of the present invention depends on the mechanism in which the column spacer 210 and the protrusion 110 are together deformed by an external load and together restored to their original state when the external load is removed.

Hereinafter, the thin film transistor array formed below the protrusion 110 will be described with reference to FIG. 9.

FIG. 9 is a plane view illustrating the LCD device according to the present invention.

As shown in FIG. 9, in the LCD device of the present invention, the protrusion 110 of an organic material is formed before or after the alignment layer is formed.

The LCD device of the present invention as shown comprises in FIG. 7, first and second substrates 100 and 200 opposing each other, a protrusion 110 formed of an organic material on the first substrate 100, and a column spacer 210 formed on the second substrate 200 to substantially correspond to the protrusion 110 (see FIG. 7).

In more detail, in reference to FIG. 9, the first substrate 100 includes gate lines 101 including gate electrodes 101a, formed in a first direction, a gate insulating layer (not shown) formed on the entire surface of the first substrate 100 including the gate lines 101, island shaped semiconductor layers 104 formed on the gate insulating layer to cover the gate electrodes 101a, data lines 102 formed on the gate insulating layer in a second direction vertical to the gate lines 101 and provided with source electrodes 102a extending therefrom, a passivation layer (not shown) formed on the entire surface of the first substrate 100 including the data lines 102, and pixel electrodes 103 and common electrodes 107a alternately formed in pixel regions above the passivation layer. The common electrodes 107a are extended from common lines 107 adjacent to and parallel with the gate lines 101.

Each of the thin film transistors includes a gate electrode 101a extending from the gate line 101, a source electrode 102a extending from the data line 102 in a substantially 'U' shape, a drain electrode 102b spaced apart from the source electrode 102a and partially inserted into the substantially 'U' shaped pattern of the source electrode 102a, and a semiconductor layer 104 formed above the gate electrodes 101a to partially adjoin lower portions of the source/drain electrodes 102a/102b. The semiconductor layer 104 may be formed by depositing an amorphous silicon layer on a lower portion and an impurity layer on an upper portion. The impurity layer is removed from a portion between the source electrode 102a and the drain electrode 102b.

The second substrate 200 may further comprise a black matrix layer 201 shielding regions (gate and data lines) other than the pixel regions along with the region for the thin film transistor, a color filter layer 202 formed on the second substrate 200 including the black matrix layer 201 to correspond to the pixel regions, an overcoat layer 203 formed on the entire surface of the second substrate 200 including the black matrix layer 201 and the color filter layer 202, and a column spacer 210 formed on the overcoat layer 203 to correspond to the protrusion 110. (See FIG. 7).

Meanwhile, referring to FIG. 9, reference numeral 108, denotes a contact hole that partially exposes the drain electrode 102b in the passivation layer. The contact hole serves to electrically connect the drain electrode 102b with the pixel electrode 103. It is to be understood that while FIG. 9 illustrates an In-Plane-Switching mode device, the present invention applies to other modes of liquid crystal display devices as well. Thus, the invention is not limited to that of In-Plane-Switching.

One method for manufacturing the LCD device of the present invention will now be described in brief First, opposing first and second substrates 100 and 200 are prepared.

The thin film transistor array (gate and data lines, pixel electrodes, and thin film transistors) may be formed on the first substrate, while the color filter array (black matrix layer, color filter layer, overcoat layer) and alignment layer may be formed on the second substrate 200.

Subsequently, the column spacer 210 of a first organic material is formed on a predetermined portion of the second substrate 200.

The protrusion 110 of a second organic material is then formed on a portion of the first substrate 100 substantially corresponding to the column spacer 210, and has an upper surface of a critical dimension relatively smaller than that of the column spacer 210.

Afterwards, liquid crystals (not shown) are dropped onto any one of the first substrate 100 and the second substrate 200.

Next, the first and second substrates 100 and 200 are bonded to each other so that the protrusion 110 on the first substrate 100 substantially opposes the column spacer 210 on the second substrate 200.

The protrusion may be formed by the following methods.

First, the protrusion may be formed by preparing a solution in which resin including the ball spacer is dispersed, and dotting the solution using an inkjet device.

Second, the protrusion may be formed by preparing a negative photoresist film including the ball spacer, and dotting the negative photoresist film using an inkjet device.

Finally, the protrusion may be formed by coating the second organic material on the first substrate and selectively exposing and developing the coated material.

The column spacer substantially opposing the protrusion may be formed by coating the first organic material on the second substrate and selectively exposing and developing the coated material.

The first organic material and the second organic material have an elastic recovery rate in the range of about 60% or greater.

Although the aforementioned LCD device has been described based on the IPS mode, it may be applied to a twisted nematic (TN) mode using the same or similar column spacer and the same or similar protrusion.

As described above, the LCD device and the method for manufacturing the same according to the present invention have the following advantages.

Since the protrusion having a relatively small upper surface is formed to substantially oppose the column spacer, the frictional force between the column spacer and the substrate can be reduced. In this case, even though distortion between the substrates occurs due to rubbing (touch), the substrates can be restored to their original state, thereby improving an unbalanced black state.

In addition, since the protrusion is formed of an organic material the same as or similar to that of the column spacer, it is possible to prevent the column spacer from being deformed by an external load or pressure during a bonding process and to easily restore the column spacer to its original state when the external load is removed.

Moreover, since the material of the protrusion may be varied, the load is uniformly dispersed through both the protrusion and the column spacer when an external load is applied or the substrates are bonded to each other. As a result, it is possible to prevent plastic deformation of the protrusion or the column spacer from occurring and also to avoid an imprinting defect due to such plastic deformation.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An LCD device comprising:
    first and second substrates opposing each other;
    gate and data lines crossing each other on the first substrate to define pixel regions; thin film transistors formed at the crossings of the gate lines and data lines;
    a column spacer formed of a first organic material on a predetermined portion of the second substrate;
    a protrusion formed of a second organic material on the first substrate substantially corresponding to the position of said column spacer, the protrusion having an upper surface of a dimension relatively smaller than that of said column spacer, wherein the protrusion includes a ball spacer formed on a fixed position of the first substrate; and
    a liquid crystal layer filled between the first and second substrates, wherein the first organic material and the second organic material have an elastic recovery rate of 60% or greater,
    the elastic recovery is rate of the first organic material is $(L'/L)*100$ (here, $L'$: deformation range of the column spacer to reach a predetermined time period under pressure of a certain level, $L$: deformation range of the column spacer after the load is completely removed), and wherein the elastic recovery rate of the second organic material is $(L'/L)*100$ (here, $L'$: deformation range of the protrusion to reach a predetermined time period under pressure of a certain level, $L$: deformation range of the protrusion after the load is completely removed).

2. The LCD device as claimed in claim 1, wherein the first organic material is the same as the second organic material.

3. The LCD device as claimed in claim 1, wherein the ball spacer includes at least one of polystyrene, divinyl benzene, poly-vinyl alcohol, and poly-acrylate.

4. The LCD device as claimed in claim 1, wherein the ball spacer has a diameter of about 20 µm or less.

5. The LCD device as claimed in claim 1, wherein the lower surface of the column spacer corresponding to the second substrate has a critical dimension of about 20 µm to 50 µm.

6. The LCD device as claimed in claim 1, wherein the column spacer includes a photo-initiator, a thermal-initiator, a responsive monomer, and an adhesion promoter.

7. A method for manufacturing an LCD device comprising:
    preparing first and second substrates opposing each other;
    forming a thin film transistor array on the first substrate and a color filter on the second substrate;
    forming a column spacer of a first organic material on a predetermined portion of the second substrate;
    forming a protrusion formed of a second organic material on the first substrate to substantially correspond to the column spacer, the protrusion having an upper surface of a critical dimension relatively smaller than that of the column spacer, wherein the protrusion includes a ball spacer formed on a fixed position of the first substrate to oppose the column spacer;
    dropping liquid crystals onto any one of the first substrate and the second substrate; and
    bonding the first and second substrates to each other so that the protrusion on the first substrate substantially opposes the column spacer on the second substrate, wherein the first organic material and the second organic material have an elastic recovery rate of 60% or greater,
    the elastic recovery rate of the first organic material is $(L'/L)*100$ (here, $L'$: deformation range of the column spacer to reach a predetermined time period under pressure of a certain level, $L$: deformation range of the column spacer after the load is completely removed), and wherein the elastic recovery rate of the second organic material is $(L'/L)*100$ (here, $L'$: deformation range of the protrusion to reach a predetermined time period under pressure of a certain level, L: deformation range of the protrusion after the load is completely removed).

8. The method as claimed in claim 7, wherein the protrusion is formed by preparing a solution in which a resin including a ball spacer is dispersed and dotting the solution using an inkjet device.

9. The method as claimed in claim 7, wherein the protrusion is formed by preparing a negative photoresist film including a ball spacer and dotting the negative photoresist film using an inkjet device.

10. The method as claimed in claim 7, wherein the protrusion is formed by coating the second organic material on the first substrate and selectively exposing and developing the coated organic material.

11. The method as claimed in claim 7, wherein the column spacer is formed by coating the first organic material on the second substrate and selectively exposing and developing the coated organic material.

* * * * *